United States Patent
Mermoud et al.

(10) Patent No.: US 11,100,364 B2
(45) Date of Patent: Aug. 24, 2021

(54) ACTIVE LEARNING FOR INTERACTIVE LABELING OF NEW DEVICE TYPES BASED ON LIMITED FEEDBACK

(71) Applicant: Cisco Technology, Inc., San Jose, CA (US)

(72) Inventors: Grégory Mermoud, Veyras (CH); Pierre-André Savalle, Rueil-Malmaison (FR); Jean-Philippe Vasseur, Saint Martin d'uriage (FR); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 16/194,442

(22) Filed: Nov. 19, 2018

(65) Prior Publication Data

US 2020/0160100 A1    May 21, 2020

(51) Int. Cl.
*G06K 9/62* (2006.01)
*G06N 20/00* (2019.01)
*H04L 12/26* (2006.01)

(52) U.S. Cl.
CPC ......... *G06K 9/6218* (2013.01); *G06K 9/6256* (2013.01); *G06N 20/00* (2019.01); *H04L 43/062* (2013.01); *H04L 43/08* (2013.01)

(58) Field of Classification Search
CPC ..... H04L 43/062; H04L 43/08; G06K 9/6256; G06K 9/6218; G06N 20/00
See application file for complete search history.

(56) References Cited

U.S. PATENT DOCUMENTS

| | | | |
|---|---|---|---|
| 9,105,178 B2 | 8/2015 | Carlson | |
| 9,621,431 B1 | 4/2017 | Cardente et al. | |
| 9,838,278 B2 | 12/2017 | Chadha et al. | |
| 2014/0244834 A1 | 8/2014 | Guedalia et al. | |
| 2016/0226713 A1* | 8/2016 | Dellinger | H04M 1/7253 |
| 2018/0032901 A1* | 2/2018 | Chowdhury | G06N 20/10 |

(Continued)

FOREIGN PATENT DOCUMENTS

EP    3382960 A2    3/2018

OTHER PUBLICATIONS

Simon et al.; "Semi-Supervised Approach to Rapid and Reliable Labeling of Large Data Sets"; KDD'08, Aug. 24-27, 2008, Las Vegas, Nevada, USA. (Year: 2008).*

(Continued)

*Primary Examiner* — Tonia L Dollinger
*Assistant Examiner* — Jihad K Boustany
(74) *Attorney, Agent, or Firm* — Behmke Innovation Group LLC; Kenneth J. Heywood; Jonathon P. Western (57) ABSTRACT

In one embodiment, a device clusters traffic feature vectors for a plurality of endpoints in a network into a set of clusters. Each traffic feature vector comprises traffic telemetry data captured for one of the endpoints. The device selects one of the clusters for labeling, based in part on contextual data associated with the clusters that was not used to form the clusters. The device obtains a device type label for the selected cluster by providing data regarding the selected cluster and the contextual data associated with that cluster to a user interface. The device provides the device type label and the traffic feature vectors associated with the selected cluster for training a machine learning-based device type classifier.

19 Claims, 8 Drawing Sheets

(56) References Cited

U.S. PATENT DOCUMENTS

| | | | |
|---|---|---|---|
| 2018/0300576 A1* | 10/2018 | Dalyac | G06K 9/3241 |
| 2019/0287030 A1* | 9/2019 | Varughese | G06F 16/285 |
| 2020/0076842 A1* | 3/2020 | Zhou | G06N 3/0454 |
| 2020/0211721 A1* | 7/2020 | Ochoa | G06N 5/003 |

OTHER PUBLICATIONS

Semi-Supervised Active Learning for Sequence Labeling; Proceedings of the 47th Annual Meeting of the ACL and the 4th IJCNLP of the AFNLP, pp. 1039-1047; (Year: 2009).*

European Search Report dated Jan. 22, 2020 in connection with European Application No. 19204071.5.

Lear et al. "Manufacturer Usage Description Specification draft-ietf-opsawg-mud-20" Network Working Group; Apr. 9, 2018; pp. 1-58.

* cited by examiner

ACTIVE LEARNING FOR INTERACTIVE LABELING OF NEW DEVICE TYPES BASED ON LIMITED FEEDBACK

TECHNICAL FIELD

The present disclosure relates generally to computer networks, and, more particularly, to active learning for interactive labeling of new device types based on limited feedback.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device clusters traffic feature vectors for a plurality of endpoints in a network into a set of clusters. Each traffic feature vector comprises traffic telemetry data captured for one of the endpoints. The device selects one of the clusters for labeling, based in part on contextual data associated with the clusters that was not used to form the clusters. The device obtains a device type label for the selected cluster by providing data regarding the selected cluster and the contextual data associated with that cluster to a user interface. The device provides the device type label and the traffic feature vectors associated with the selected cluster for training a machine learning-based device type classifier.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

Figure 1A:
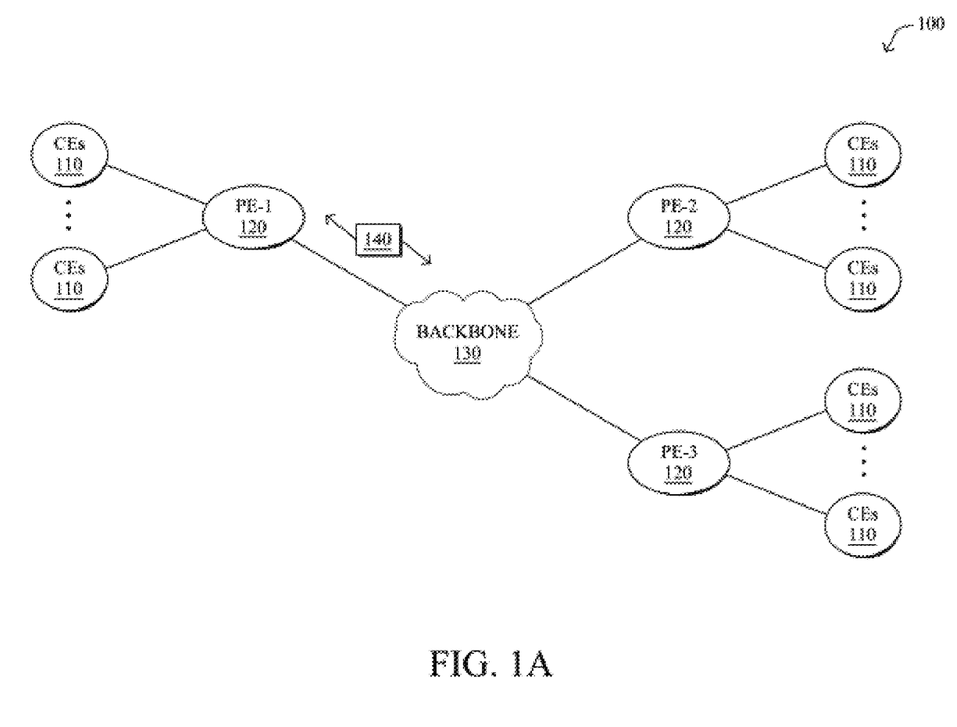
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
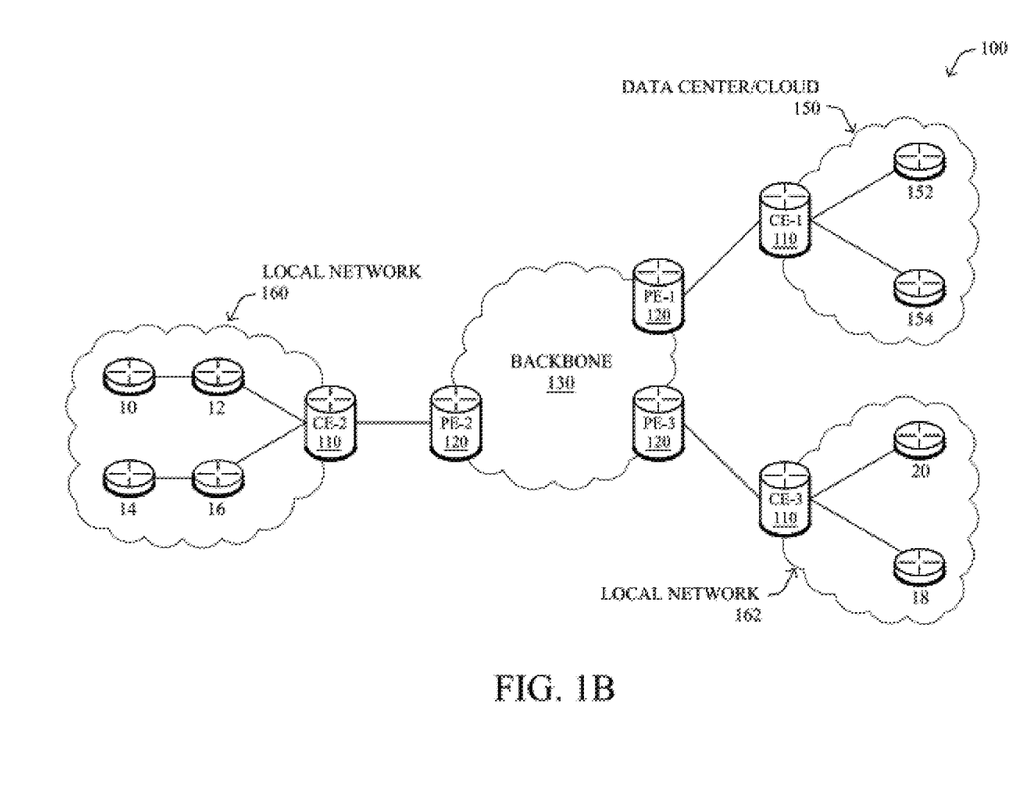

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
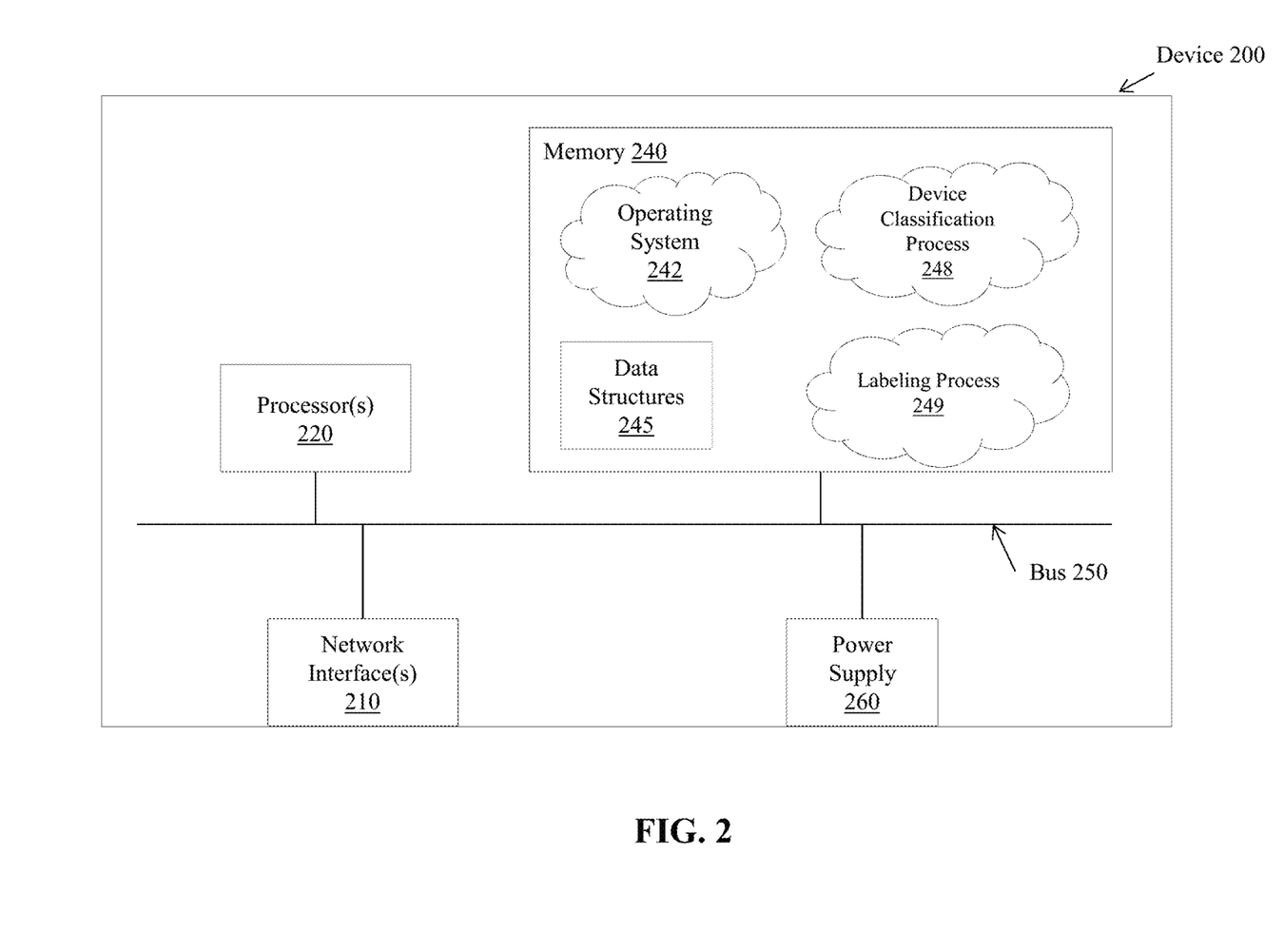
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a labeling process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a, b, c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
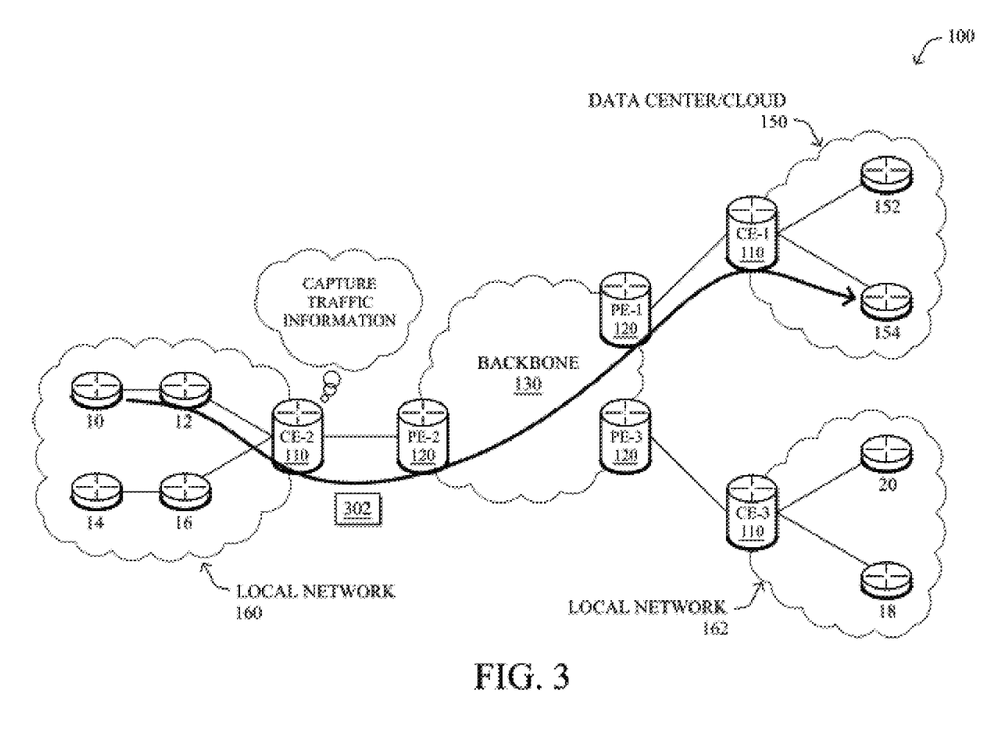
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

More specifically, most device classification systems (DCSs) today rely on simple rules and heuristics to classify devices. For instance, information extracted from DHCP or HTTP traffic can sometimes provide a pretty good clue as to the type of device. Notably, the DHCP vendor class identifier may directly indicate that the device is an Android phone, while the HTTP user agent may reveal more information about the operating system of the device. Similarly, the organizationally unique identifier (OUI) can be used to narrow down potential device types based on the corresponding manufacturer. In further examples, device type classification can be achieved by using active and/or passive probing of devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A DCS may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

As noted above, typical device classification approaches rely on handcrafted rules that define the device characteristics of a particular type of device. These approaches, however, do not scale and are often error-prone. For example, a set of classification rules manually derived in one network may rely on attributes or information that is unique to that network (e.g., relying on hostname conventions, etc.). Finally, due to the manual task of adding new devices, it is challenging to consider too many characteristics or complex rules as these are hard to assess or reason about.

Active Learning for Interactive Labeling of New Device Types Based on Limited Feedback The techniques herein leverage machine learning techniques to gather labels about large groups of endpoint devices in the network using only a minimal amount of user input. In some aspects, this may be achieved by clustering endpoints according to their observed traffic and presenting only a few, large and homogeneous groups of endpoints to a user interface for labeling. In further aspects, the system may adaptively balance multiple selection criteria when selecting the clusters for labeling, such as a labeling success rate or other implicit feedback signals. In turn, the labeled cluster information can be used as part of a training dataset to train a machine learning-based device type classifier that is able to recognize new types of devices.

Specifically, according to one or more embodiments of the disclosure as described in detail below, a device clusters traffic feature vectors for a plurality of endpoints in a network into a set of clusters. Each traffic feature vector comprises traffic telemetry data captured for one of the endpoints. The device selects one of the clusters for labeling, based in part on contextual data associated with the clusters that was not used to form the clusters. The device obtains a device type label for the selected cluster by providing data regarding the selected cluster and the contextual data associated with that cluster to a user interface. The device provides the device type label and the traffic feature vectors associated with the selected cluster for training a machine learning-based device type classifier.

Illustratively, the techniques described herein may be performed by hardware, software, and/or firmware, such as in accordance with the labeling process 249, which is may include computer executable instructions executed by the processor 220 (or independent processor of interfaces 210) to perform functions relating to the techniques described herein, e.g., in conjunction with device classification process 248.

Figure 4:
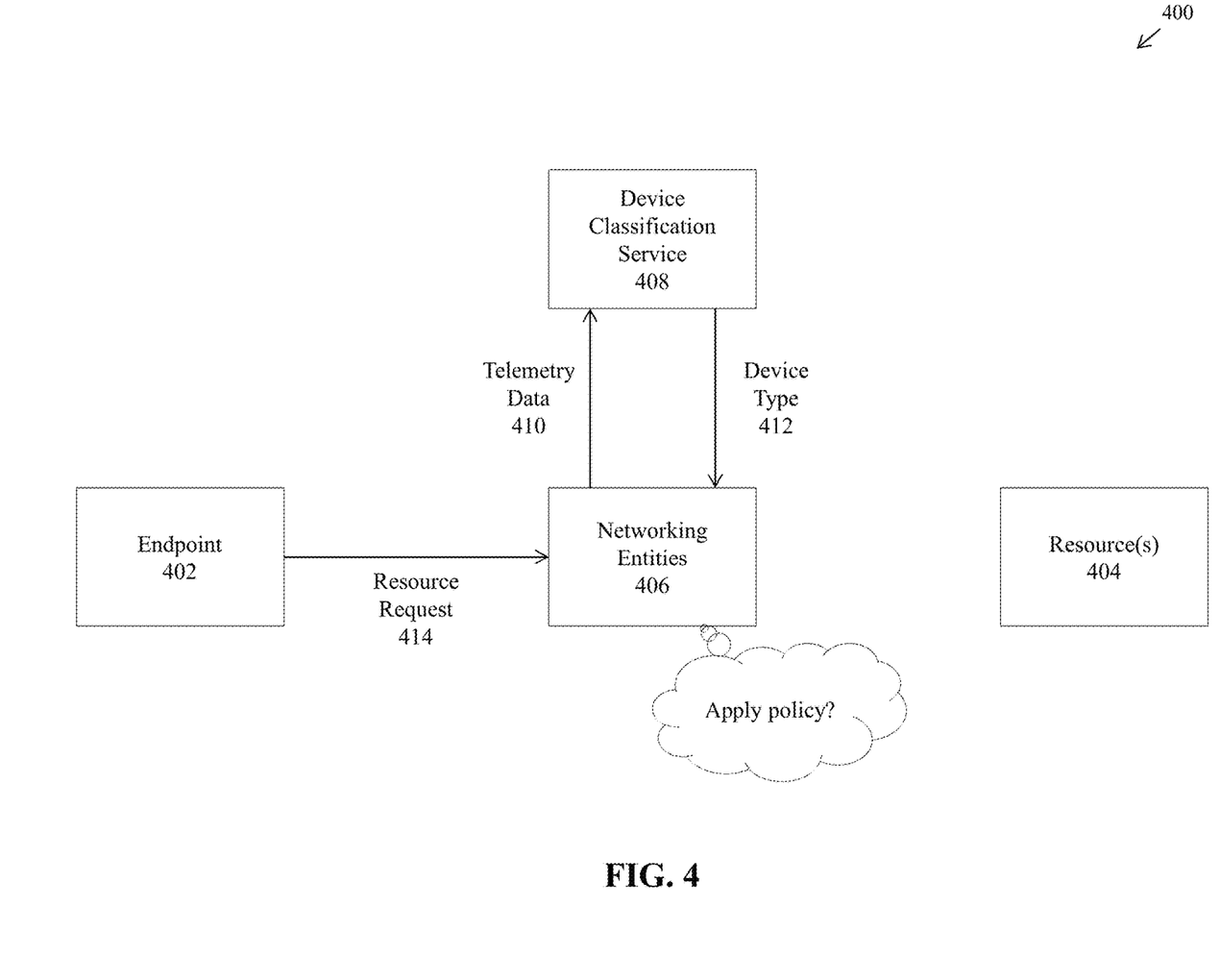
FIG. 4 illustrates an example of a device classification service in a network.

Operationally, FIG. 4 illustrates an example of a device classification service in a network, in various embodiments. As shown, network 400 may generally include an endpoint 402 (e.g., a user device, a sensor, an actuator, etc.), any number of resources 404, and any number of networking elements 406 that are configured to provide connectivity between endpoint 402 and resource(s) 404. For example, networking elements 406 may include access points, wireless LAN controllers (WLCs), switches, routers, security devices (e.g., firewalls, device identity services, etc.), and the like. Network resources 404 may include cloud-based services, specific servers or other endpoints, webpages, or any other resource with which endpoint 402 could communicate.

Also as shown in FIG. 4 is a device classification service 408 that may be hosted on one or more of networking elements 406 or be in communication therewith. In general, device classification service 408 is configured to take as input telemetry data 410 captured by networking element 406 regarding network traffic associated with endpoint 402 and, based on the captured telemetry, identify the device type 412 of endpoint 402 (e.g., by execution of device classification process 248, described previously). For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint 402. In various embodiments, device classification service 408 may use a machine learning-based classifier to classify telemetry data 410 and assign device type 412 to endpoint 402.

Note that the classification of endpoint 402 by service 408 can also, in some embodiments, be of varying specificity, depending on the telemetry data 410 available to service 408 and/or its degree of confidence in a particular classification. For example, device classification service 408 may determine, with a high degree of confidence, that endpoint 402 is an Apple iPhone, but may or may not be able to determine whether 402 is an iPhone 5s or an iPhone 6. Accordingly, in some embodiments, service 408 may also return the confidence values for the classification label(s) in device type 412 to networking element 406.

The labeling of endpoint 402 with a device type 412 by device classification service 408 may initiate enforcement of one or more network policies by networking element 406 with respect to endpoint 402. Such network policies may include, but are not limited to, security policies, network traffic or quality of service (QoS) policies, access polices, and the like. For example, as shown, assume that endpoint 402 sends out a resource request 414 for a particular one of resources 404. In turn, networking elements 406 may determine whether to allow or block resource request 414 from reaching its target resource 404, based on the policy associated with the determined device type 412 of endpoint 402. For example, if endpoint 402 is determined to be a smart thermostat, it may be prevented from accessing certain online resources, such as an email service. Similarly, if endpoint 402 is determined to be a safety-related sensor, a traffic or QoS policy associated with device type 412 may cause networking elements 406 to assign a higher priority to traffic from endpoint 402.

Figure 5:
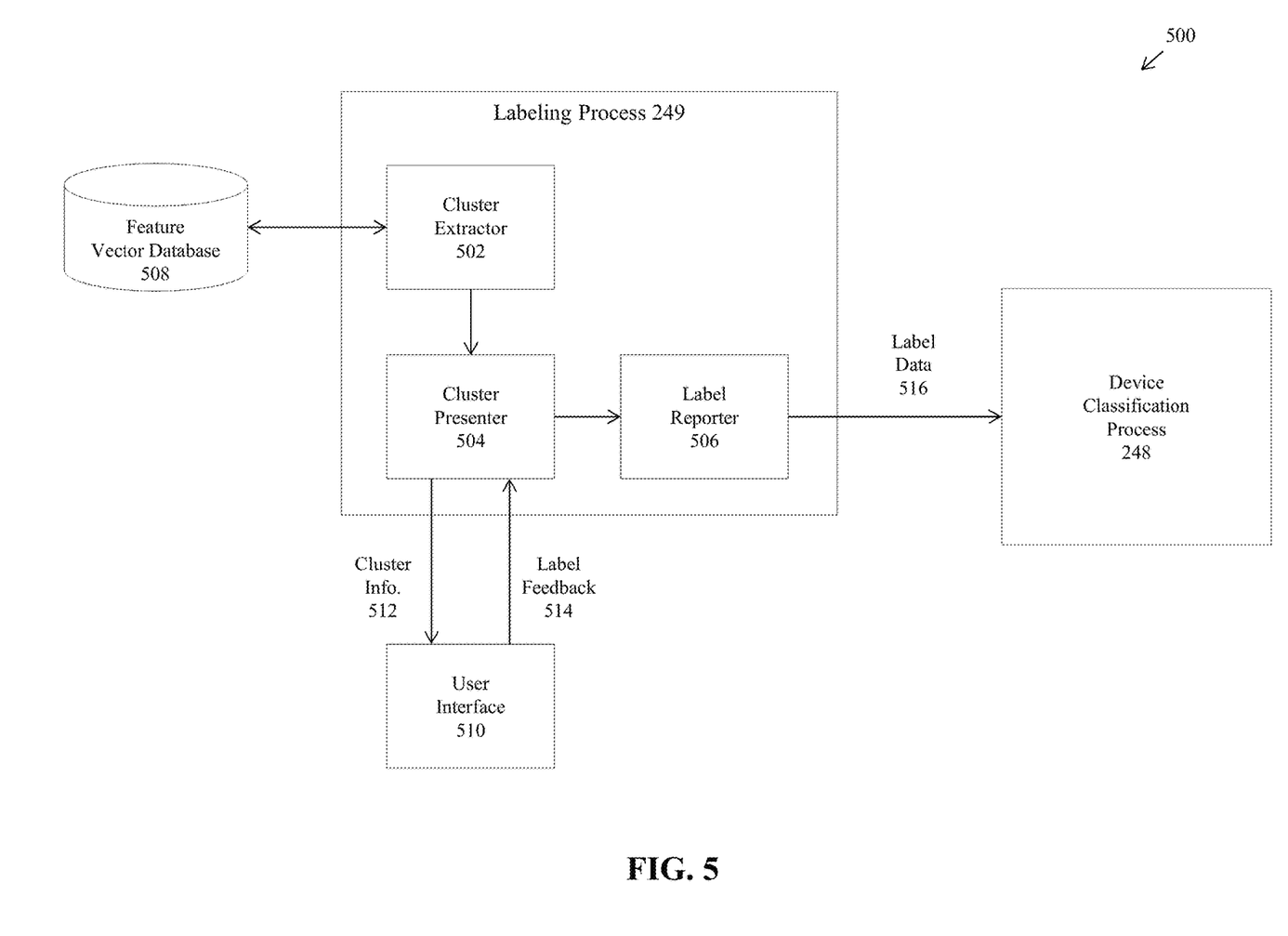
FIG. 5 illustrates an example architecture for obtaining device type labels for training a machine learning-based device type classifier.

FIG. 5 illustrates an example architecture 500 for obtaining device type labels for training a machine learning-based device type classifier, according to various embodiments. As shown, labeling process 249 may operate in conjunction with device classification process 248 to provide label data 516 to device classification process 248 for purposes of training the machine learning-based device type classifier(s) of device classification process 248. In various embodiments, architecture 500 may include a cluster extractor 502, a cluster presenter 504, a label reporter 506, a feature vector database 508, and/or a user interface 510. These components 502-510 may be implemented in a distributed manner or implemented on a single device. In addition, some or all of components 502-510 may be implemented as part of a monitored network (e.g., on networking entities 406) or part of a cloud-based device classification service. The functionalities of the components of architecture 500 may also be combined, omitted, or implemented as part of other processes, as desired.

In various embodiments, architecture 500 may include feature vector database 508 that stores feature vectors representing network traffic from endpoints in one or more networks. In particular, feature vector database 508 may be populated using the telemetry data captured for the network traffic associated with the endpoints under scrutiny in a network. In one embodiment, a feature vector may be summarization of the traffic telemetry data for an endpoint. For example, each dimension of the feature vector may be a binary indicator as to whether a particular characteristic was present in the traffic (e.g., whether the traffic used a particular protocol, header field, etc.) for a given window of time. Database 508 may include historical data for a long time period (e.g., weeks, months, years, etc.) and needs not include only information about recently seen endpoint devices.

During execution, cluster extractor 502 is responsible for extracting clusters of endpoints based on the feature vectors in feature vector database 508 for all endpoint devices that could be classified. Cluster extractor 502 may do so periodically or on demand, such as when retraining of the classifier of device classification process 248 is requested. In general, the goal of cluster extractor 502 is to extract groups of endpoints that are very similar based on their network traffic as encoded by the feature vectors in feature vector database 508, considering that the number of features (e.g., vector dimensions) may be very large.

Typically, there may be a lot of variance between feature vectors for even a single endpoint device type. To increase robustness, cluster extractor 502 can employ a dimensionality reduction technique on the feature vectors of feature vector database 508, in order to extract salient behaviors and dimensions. This can include techniques such as random projections, non-linear principal component analysis, topic modeling techniques such as nonnegative matrix factorization (NMF), or latent Dirichlet allocation (LDA). The main advantage of topic models over the other re-projection techniques is their intrinsic interpretability. Notably, topic modeling techniques assume that each sample in the dataset is associated to some topics in a certain proportion and that each value in the features set of the dataset is also associated to some topics in a certain proportion. This yields a low dimensional space where:

- each dimension is a topic,
- each topic is a collection of the original features' values in the higher dimensional space, and
- the coordinates of a sample in the lower dimensional space are nothing but the proportion of assignment for that sample to the different topics.

An example of such topics is shown below, with the format
OriginaFeatureName: FeatureValue:
Topic 1:
OUI: AzureWave Technologies, Inc.
cdpCachePlatform: cisco WS-C3560E-48TD
Operative-System: Cisco 827H ADSL router
Topic 2:
OUI: Samsung Electronics
cdpCacheVersion: ATA030100SCCP040305B
2717-tcp: pn-requester
dhcp-max-message-size: 1200.0

As would be appreciated, topic modeling techniques provide an explicit description for each dimension, allowing for the easy identification of what is in common and similar values of coordinates along any given topic. This information, opportunely rephrased, is valuable contextual information that can be added to the information presented for labeling, as detailed below.

While cluster extractor 502 may utilize any number of machine learning clustering approaches, certain approaches have been found to be more suitable for purposes of implementing cluster extractor 502. In particular, density-based clustering or similar techniques that can avoid clustering isolated points are particularly well-suited for implementing cluster extractor 502. Generally, the selected clustering approach should avoid producing clusters that are too small, as these are of little interest and would require a cumbersome amount of labeling.

Figure 6:
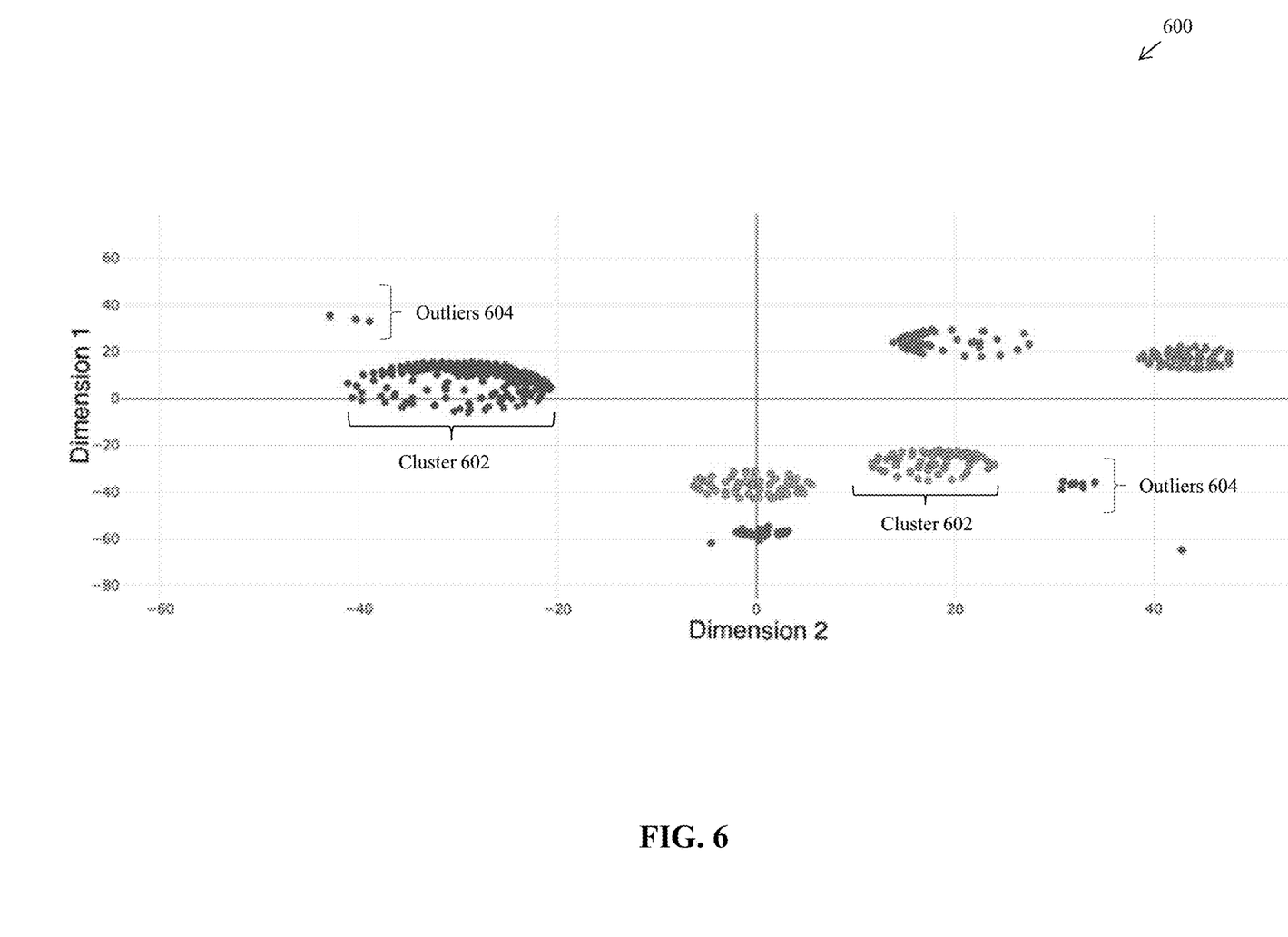
FIG. 6 illustrates an example plot of clusters of endpoints.

FIG. 6 illustrates an example plot 600 of clusters of endpoints that cluster extractor 502 may form using a density-based clustering approach. As shown, each endpoint is represented according to their values in two different dimensions (e.g., traffic characteristics, etc.). Of course, any number of different dimensions can be used when clustering endpoints. From plot 600, it can be seen that the endpoints fall into one of two categories: 1.) those that belong to a cluster, such as clusters 602 shown, and 2.) outliers that are not assigned to a cluster because of their isolation.

Referring again to FIG. 5, cluster presenter may be responsible for selecting a short-list of clusters formed by cluster extractor 502 for labeling. For example, cluster presenter 504 may send cluster information 504 regarding a particular cluster to user interface 510 and, in return, receive label feedback 514.

In various embodiments, the techniques herein propose the use of an adaptive mechanism to control which clusters are selected by cluster presenter 504 for labeling, based on label feedback 514. At a high level, this approach uses active learning with a complex loss function introduced herein to make the selection decisions. In particular, in addition to answering "how many endpoint devices will labeling this cluster help device classification process 248 to recognize," the selection criteria can also take into account how likely the user is to be able to provide an accurate label.

Typically, the reliability of a label provided in label feedback 514 will depend highly on how much context can be provided to the user via user interface 510 to guide the labeling. For example, while a set of endpoints may form a very 'dense' cluster, this may be non-interpretable to the user of user interface 510, as this is computed by cluster extractor 502 from network traffic, possibly after performing very complex dimensionality reduction steps. Thus, in some embodiments, cluster presenter 504 may also include additional context in cluster information 512, to better aid in the labeling.

Context that cluster presenter 504 may include in cluster information 512 when making a labeling request to user interface 510 may include network specific information such as, but not limited to, the locations of the endpoint devices, the network elements to which they are attached (e.g., APs, switches, etc.), AD user names, the types of traffic observed, or the like. In many cases, the context data may be separate information than included in feature vector database 508 for purposes of cluster extractor 502 forming the endpoint clusters. However, in further cases, the context data is not limited as such and can also overlap with some of the features used for clustering. For example, in further embodiments, the context included in cluster information 512 may include information regarding the protocols used by the traffic of the endpoints, information from DPI of DNS, DHCP, HTTP traffic, etc.

In some embodiments, cluster presenter 504 may select clusters for labeling according to a weighted combination of the two criteria above, and adaptively changes one or both of the parameters of the clustering done by cluster extractor 502 and the relative importance of the two criteria. For example, cluster presenter 504 may use any or all of the following to dynamically select one or more clusters for labeling from user interface 510:

Confidence level: cluster presenter 504 may assess a metric computed by cluster extractor 502 that reflects the 'purity' of the cluster (e.g., how consistent the cluster is in terms of the endpoint devices that it groups). In general, the more there is a predominant type of device in a cluster, the higher the purity of that cluster. In one embodiment, the cluster homogeneity can be used to compute this confidence. Preliminary testing of the techniques herein resulted in a homogeneity score of 72.67%. In another embodiment, the cluster compactness may also be used as a strong indicator of the confidence level. In this case, the compactness represents how far the endpoint devices in the cluster are from one another.

Another metric may be used when "soft" labels are available to cluster presenter 504. Here, a "soft" label refers to a preliminary label for a cluster that cannot be fully trusted. For example, all devices grouped as "similar" may all match a known soft label. For example, the Manufacturers Usage Description (MUD) Specification describes a mechanism whereby devices can indicate their own device types. Such a soft label can also be used to compute the level of confidence. Still, if all endpoint devices in a given cluster match a known soft label, this adds to the confidence in building qualitative clusters.

Cluster size: it may be advantageous to select clusters having a large number of devices, as labeling the cluster will have a greater effect on reducing the number of "unknown" devices in the network. As a tradeoff, however, larger clusters may also be more difficult to label.

Criticality: cluster presenter 504 may also employ a policy whereby clusters are selected for labeling according to their suspected level of criticality. For example, in certain environments, endpoint devices using a given applications (e.g. healthcare) are likely to be more critical than devices reporting temperatures. Such a policy may also be specified via user interface 510, in some cases.

Diversity between clusters: cluster presenter 504 may also choose to request labeling of clusters that are very different from one another (e.g., far from each other, according to some distance measure).

Cluster presenter may also use an adaptive feedback loop that based on explicit and/or implicit signals, to adjust how it selects clusters for labeling. Such signals may include, for example, any or all of the following regarding the labeling actions:

Label feedback 514 indicating that the user of user interface 510 cannot label a cluster. Cluster presenter 504 can use this as a signal that more weight should be put on "explanability" and less on presenting a very large cluster.

The time it took the user of user interface 510 to label a cluster can be used as a weak signal of the same issue above.

A streak of successfully attributed labels can be used by cluster presenter 504 as an opposite signal that a greedier cluster selection approach should be used and larger clusters should be selected for labeling.

Previous experience with user labelling: cluster presenter 504 may also maintain a history of labels provided by a particular user via user interface 510 and whether those labels have been confirmed by other users. In such a case, cluster presenter 504 may select users based on their knowledge of endpoint devices of a specific nature, based on their past experience (e.g., user X was successful at labeling devices that used protocols X and were mobile devices, etc.).

The adaptive feedback loop introduced herein is especially important, as not all contextual information will be available all the time. Notably, depending on the network and the available data sources, some contextual information may be missing, making it difficult to use a static system.

Optionally, cluster presenter 504 may also maintain a blacklist of clusters, in some embodiments. As clustering is updated periodically, cluster presenter 504 may keep selecting this cluster for labeling, even if the user of user interface 510 is unable to label the cluster. This is counterproductive and can be very frustrating from a user experience perspective. The blacklist can store summarized information about clusters that have not been successfully labeled by a given user. For example, cluster presenter 504 may use an explicit set of centroid feature vectors (e.g., the "mean" of each cluster that was declined), and remove from the short list any cluster whose centroid is too close from a point in the black list.

User interface 510 may present cluster information 512 visually using any or all of the following elements:

Identification of all or a subset of the endpoints in the selected cluster (e.g., IP addresses, MAC addresses, other identifiers, etc.).

If a subset of the cluster is displayed, some information about how many endpoints this one single label may help to correctly recognize in the network (e.g., the size of the cluster).

Contextual information for the cluster included in cluster information 512, as described above.

The "distance" between clusters (e.g., how different the endpoint devices of cluster A are from the endpoint devices of cluster B).

The user of user interface 510 can also take multiple actions with respect to a label request. For example, the user may label the entire cluster, only a portion of the cluster, or decline labeling the cluster. In turn, user interface 510 may return an indication of the labeling action to cluster presenter 504 as label feedback 514.

Also as shown, label reporter 506 may be responsible for providing label data 516 to device classification process 248 for purposes of (re)training its machine learning-based device classifier. For example, label data 516 may include the feature vectors from feature vector database 508 used to form the labeled cluster, as well as the label(s) applied to the cluster via label feedback 514. Classifier retraining can be triggered at device classification process 248 in response to a new labeled cluster, when it receives N-number of labeled clusters, if the number of endpoint devices in a newly labeled cluster is above a defined threshold, on request, or at any other time. Note also the components of architecture 500 shown can communicate using APIs or direct communication pipelines, in various embodiments.

Figure 7:
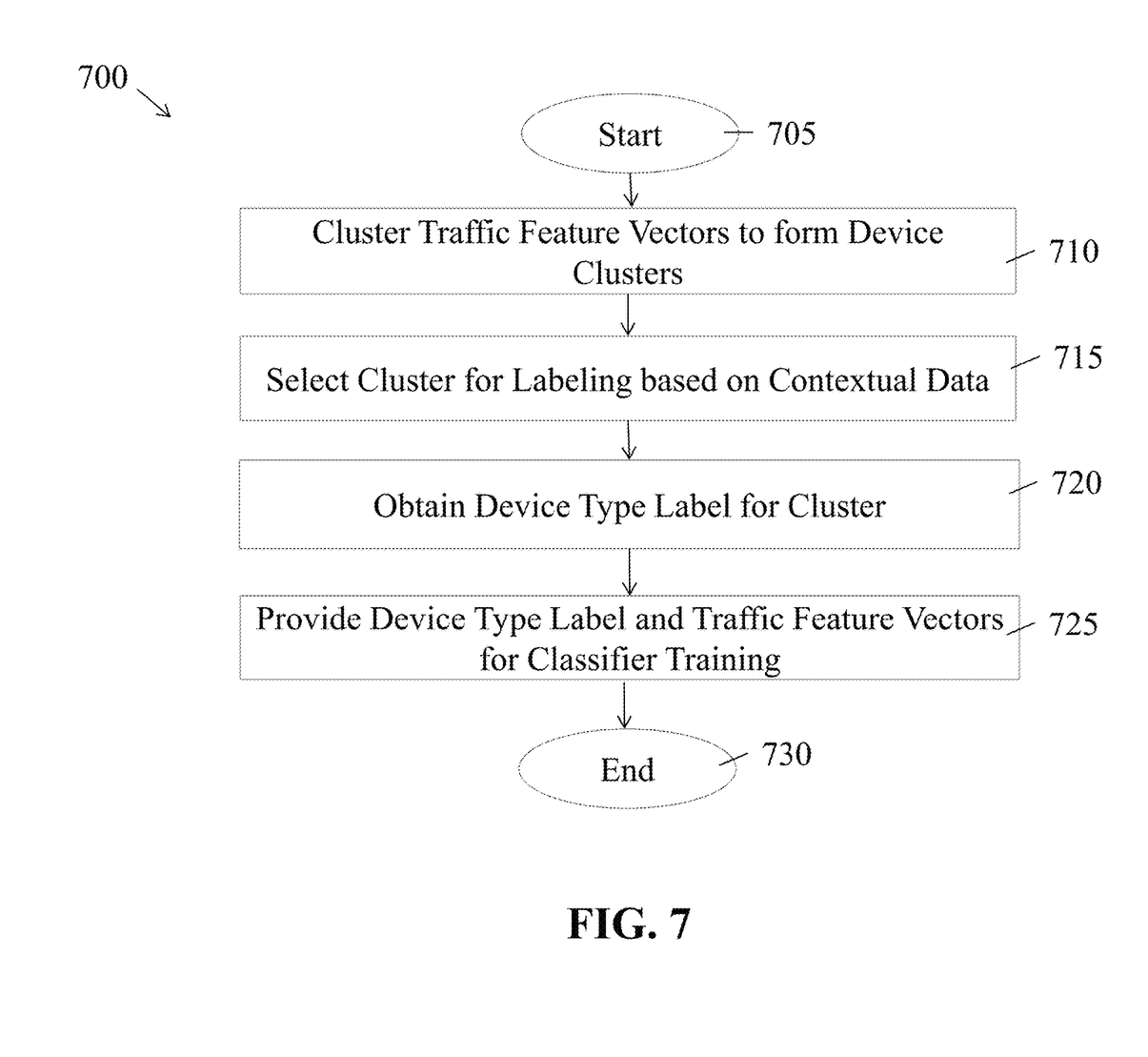
FIG. 7 illustrates an example simplified procedure for providing an obtained device type label for training a machine learning-based device type classifier.

FIG. 7 illustrates an example simplified procedure for providing an obtained device type label for training a machine learning-based device type classifier, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may cluster traffic feature vectors for a plurality of endpoints in a network into a set of clusters. Each traffic feature vector may comprise traffic telemetry data captured for one of the endpoints. For example, in some cases, each dimension of a feature vector may indicate (e.g., on a binary scale, etc.) whether a given traffic characteristic was present (e.g., '1' if the traffic used HTTP, '0' if the traffic did not, etc.).

At step 715, as detailed above, the device may select one of the clusters for labeling, based in part on contextual data associated with the clusters that was not used to form the clusters. Notably, the device may attempt to select clusters for labeling that not only provide the greatest effect in terms of the number of endpoints, but also in terms of how well a user is expected to be able to provide a label for the cluster. The availability of contextual information, such as the locations of the endpoint devices of the cluster, the network elements to which the endpoint devices are attached, the users of the endpoints, or the like, may help the user to label the cluster with a device type.

At step 720, the device may obtain a device type label for the selected cluster by providing data regarding the selected cluster and the contextual data associated with that cluster to a user interface, as described in greater detail above. In some embodiments, the device may also use feedback regarding the labeling action to control how it selects clusters in the future for labeling. For example, the device may adjust one or more of its cluster selection criteria (e.g., cluster size, etc.), based on metrics regarding the labeling action performed by the user (e.g., length of time taken to complete a labeling action, an indication that the user could not label a given cluster, a number of consecutive labels given, etc.).

At step 725, as detailed above, the device may provide the device type label and the traffic feature vectors associated with the selected cluster for training a machine learning-based device type classifier. In doing so, the classifier can be trained to apply the same device type label to previously unseen endpoint devices in the network that exhibit similar traffic characteristics as those in the labeled cluster. For example, if a new device exhibits similar traffic characteristics as those previously labeled as "iPhones," the classifier may apply this label to the new endpoint, as well. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the gathering of training data for training a machine learning-based device type classifier in a lightweight manner from the user perspective. In some aspects, a user may be asked to label whole sets of endpoint devices that exhibit similar traffic behaviors. Selection of which clusters are to be labeled can also take into account not only the effects of the labeling (e.g., covering as many endpoint devices as possible), but also in an intelligent way to elicit the most meaningful labeling actions.

While there have been shown and described illustrative embodiments that provide for active learning for interactive labeling of new device types based on limited feedback, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    clustering, by a device, traffic feature vectors for a plurality of endpoints in a network into a set of clusters, wherein each traffic feature vector comprises traffic telemetry data captured for one of the endpoints, and wherein each dimension of each traffic feature vector comprises a binary indicator of a presence of a particular traffic characteristic in the traffic telemetry data;
    selecting, by the device, one of the clusters for labeling, based in part on contextual data associated with the clusters indicative of how likely a user is to provide an accurate label for the selected cluster, wherein the contextual data comprises data that was not used to form the clusters;
    obtaining, by the device, a device type label for the selected cluster by providing data regarding the selected cluster and the contextual data associated with that cluster to a user interface; and
    providing, by the device, the device type label and the traffic feature vectors associated with the selected cluster for training a machine learning-based device type classifier.

2. The method as in claim 1, wherein the contextual data associated with the selected cluster is further indicative of at least one of: locations of the endpoints associated with the cluster, network elements to which the endpoints associated with the cluster are attached, or user names associated with the endpoints.

3. The method as in claim 1, wherein the cluster is selected for labeling based further in part on one or more of: a measure of criticality associated with the cluster.

4. The method as in claim 1, wherein the cluster is selected for labeling based further in part on at least one of: a measure of homogeneity of the cluster or a measure of compactness of the cluster.

5. The method as in claim 1, wherein selecting the cluster for labeling further comprises:
    determining, by the device, metrics regarding labeling actions performed via the user interface; and
    adjusting, by the device, a selection criterion used by the device to select clusters for labeling.

6. The method as in claim 5, wherein the metrics are indicative of at least one of: clusters that cannot be labeled, a number of consecutive clusters labeled via the user interface, or an amount of time for a labeling action to complete.

7. The method as in claim 5, wherein the selection criterion comprises a cluster size.

8. The method as in claim 1, further comprising:
    blacklisting, by the device, a particular cluster from selection for labeling based on an indication from the user interface that that cluster cannot be labeled.

9. The method as in claim 1, wherein the data regarding the selected cluster provided to the user interface comprises one or more of: identification of at least a portion of the endpoints associated with the selected cluster, a distance between the selected cluster and another one of the clusters, or a count of endpoints associated with the cluster.

10. An apparatus, comprising:
    one or more network interfaces to communicate with a network;
    a processor coupled to the network interfaces and configured to execute one or more processes; and
    a memory configured to store a process executable by the processor, the process when executed configured to:
        cluster traffic feature vectors for a plurality of endpoints in a network into a set of clusters, wherein each traffic feature vector comprises traffic telemetry data captured for one of the endpoints, and wherein each dimension of each traffic feature vector comprises a binary indicator of a presence of a particular traffic characteristic in the traffic telemetry data;
        select one of the clusters for labeling, based in part on contextual data associated with the clusters indicative of how likely a user is to provide an accurate label for the selected cluster, wherein the contextual data comprises data that was not used to form the clusters;

obtain a device type label for the selected cluster by providing data regarding the selected cluster and the contextual data associated with that cluster to a user interface; and provide the device type label and the traffic feature vectors associated with the selected cluster for training a machine learning-based device type classifier.

11. The apparatus as in claim 10, wherein the contextual data associated with the selected cluster is further indicative of at least one of: locations of the endpoints associated with the cluster, network elements to which the endpoints associated with the cluster are attached, or user names associated with the endpoints.

12. The apparatus as in claim 10, wherein the cluster is selected for labeling based further in part on one or more of: a measure of criticality associated with the cluster.

13. The apparatus as in claim 10, wherein the cluster is selected for labeling based further in part on at least one of: a measure of homogeneity of the cluster or a measure of compactness of the cluster.

14. The apparatus as in claim 10, wherein the apparatus selects the cluster for labeling further by:

determining metrics regarding labeling actions performed via the user interface; and adjusting a selection criterion used by the apparatus to select clusters for labeling.

15. The apparatus as in claim 14, wherein the metrics are indicative of at least one of: clusters that cannot be labeled, a number of consecutive clusters labeled via the user interface, or an amount of time for a labeling action to complete.

16. The apparatus as in claim 14, wherein the selection criterion comprises a cluster size.

17. The apparatus as in claim 10, wherein the process when executed is further configured to:

blacklist a particular cluster from selection for labeling based on an indication from the user interface that that cluster cannot be labeled.

18. The apparatus as in claim 10, wherein the data regarding the selected cluster provided to the user interface comprises one or more of: identification of at least a portion of the endpoints associated with the selected cluster, a distance between the selected cluster and another one of the clusters, or a count of endpoints associated with the cluster.

19. A tangible, non-transitory, computer-readable medium storing program instructions that cause a device to execute a process comprising:

clustering, by the device, traffic feature vectors for a plurality of endpoints in a network into a set of clusters, wherein each traffic feature vector comprises traffic telemetry data captured for one of the endpoints, and wherein each dimension of each traffic feature vector comprises a binary indicator of a presence of a particular traffic characteristic in the traffic telemetry data;

selecting, by the device, one of the clusters for labeling, based in part on contextual data associated with the clusters indicative of how likely a user is to provide an accurate label for the selected cluster, wherein the contextual data comprises data that was not used to form the clusters;

obtaining, by the device, a device type label for the selected cluster by providing data regarding the selected cluster and the contextual data associated with that cluster to a user interface; and providing, by the device, the device type label and the traffic feature vectors associated with the selected cluster for training a machine learning-based device type classifier.

* * * * *

UNITED STATES PATENT AND TRADEMARK OFFICE
CERTIFICATE OF CORRECTION

PATENT NO.         : 11,100,364 B2
APPLICATION NO.    : 16/194442
DATED              : August 24, 2021
INVENTOR(S)        : Grégory Mermoud et al.

Page 1 of 1

It is certified that error appears in the above-identified patent and that said Letters Patent is hereby corrected as shown below:

In the Specification

Column 9, Line 13, please amend as shown:
in accordance with the labeling process 249, which may Signed and Sealed this
Second Day of November, 2021

Drew Hirshfeld
*Performing the Functions and Duties of the*
*Under Secretary of Commerce for Intellectual Property and*
*Director of the United States Patent and Trademark Office*